United States Patent [19]

Irikura et al.

[11] Patent Number: 5,718,105
[45] Date of Patent: Feb. 17, 1998

[54] TRANSMISSION FOR SELF-PROPELLED WALKING LAWN MOWER

[75] Inventors: Koji Irikura, Kobe; Hirohiko Kawada, Amagasaki, both of Japan

[73] Assignee: Kanzaki Kokyukoki Mfg. Co., Ltd., Hyogen-ken, Japan

[21] Appl. No.: 582,436

[22] Filed: Jan. 3, 1996

[51] Int. Cl.$^6$ .............................. A01D 34/82; B62D 51/06
[52] U.S. Cl. .............................. 56/11.4; 56/11.8; 56/16.9; 56/DIG. 6; 74/417; 180/19.1
[58] Field of Search ............................. 56/11.4, 10.3, 56/11.5, 11.8, 16.9, DIG. 6; 192/66.21, 66.23, 66.32; 180/19.1, 19.3; 74/607, 606 R, 417

[56] References Cited

U.S. PATENT DOCUMENTS

| | | |
|---|---|---|
| 2,764,268 | 9/1956 | Summerour . |
| 4,038,883 | 8/1977 | Jones . |
| 4,117,652 | 10/1978 | Jones et al. . |
| 4,209,964 | 7/1980 | Fuelling, Jr. et al. ............... 56/11.8 X |
| 4,214,641 | 7/1980 | Hauser ............................. 56/11.8 X |
| 4,354,564 | 10/1982 | Watanabe et al. ................. 180/19.1 |
| 4,466,233 | 8/1984 | Thesman . |
| 4,841,794 | 6/1989 | Hikishima . |
| 4,896,487 | 1/1990 | Hikishima et al. . |
| 4,907,401 | 3/1990 | Nemoto et al. . |
| 5,127,215 | 7/1992 | Wenzel ............................ 56/11.5 X |
| 5,447,019 | 9/1995 | Held et al. ....................... 56/DIG. 6 X |
| 5,509,323 | 4/1996 | Hallenstvedt et al. ................ 74/417 |

FOREIGN PATENT DOCUMENTS

| | | |
|---|---|---|
| 0 609 185 | 8/1994 | European Pat. Off. . |
| 414.259 | 4/1910 | France . |
| 2 582 381 | 11/1986 | France . |
| 2 013 467 | 8/1979 | United Kingdom . |

OTHER PUBLICATIONS

Japanese Unexamined Utility Model Publication No. 13825/1992, Feb. 4, 1992.

*Primary Examiner*—Terry Lee Melius
*Attorney, Agent, or Firm*—Larson & Taylor

[57] ABSTRACT

A transmission for a self-propelled walking lawn mower is disclosed, the transmission comprising:

i) a casing;

ii) input and output shafts supported by the casing, the output shaft driving ground engaging wheels of the mower and the input shaft receiving drive force from an engine of the mower wherein the input shaft extends substantially perpendicular to the output shaft and is located almost directly above the output shaft;

iii) a drive gear secured on the input shaft;

iv) a driven gear rotatably mounted on the output shaft and meshing with the drive gear; and v) a clutch for transmitting the rotation of the driven gear to the output shaft.

19 Claims, 14 Drawing Sheets

PRIOR ART

5,718,105

TRANSMISSION FOR SELF-PROPELLED WALKING LAWN MOWER

BACKGROUND OF THE INVENTION

1. Field of the Invention

The present invention relates to an improved transmission designed for self-propelled, walking lawn mowers.

2. Description of the Prior Art

In a self-propelled walking lawn mower, a drive shaft of an engine mounted on a mower frame is connected to a grass cutting blade for rotation therewith. Drive force of the drive shaft is transmitted, through a power-transmitting mechanism such as belts and/or gears etc., to an input shaft of a transmission to drive a front pair or a rear pair of ground engaging wheels. The input shaft extends substantially perpendicular to an output shaft of a transmission, i.e., to an axle for driving the ground engaging wheels or to other shafts parallel to this axle. In order to transmit the rotation of the input shaft to the output shaft extending substantially perpendicular to the input shaft and to switch on or off the power transmission from the input shaft to the output shaft, the transmission comprises a gear mechanism and a clutch. Japanese Unexamined Patent Publication No. 13825/1992 discloses such a transmission which is shown in FIG. 23. The gear mechanism illustrated therein includes a worm A3 secured at one end of an input shaft A1 of the transmission and a worm A4 rotatably mounted on an output shaft A2. The worm gear A4 has a corn-shaped or concave friction surface. On the output shaft is mounted slider A5 which rotates with the output shaft and is slidable in an axial direction. The slider A5 has a concave or corn shape so as to fit with the gears having a corresponding corn or concave shape. A clutch is constituted by the gear A4, the slider A5, spring A6 provided therebetween and fork-shaped portions A7.

Each of the slider and friction member has a single friction surface which contacts with each other to transmit drive power. Accordingly, in order to transmit sufficient drive power, it was necessary to increase the diameter of the friction surface as shown in the drawing, resulting in a large-sized transmission. Especially, in the field of walking lawn mowers, there has been a demand for reducing the whole size and weight of a mower and therefore a demand for reducing the size and weight of a transmission for use therein.

Furthermore, the fork-shaped portions A7 for sliding the slider can be operated externally of the casing to push the slider by pivoting a rod supporting the fork-shaped portion. However, because the fork-shaped portion contacts locally or linearly with the sliders, a bearing used was locally worn in a short time.

Moreover, an operating rod for operating the fork-shaped portions A7 extends from the inside of the casing and a manipulating arm for manipulating the operating rod is connected to one end of the operating rod. However, the conventional connecting portion between the operating rod and the manipulating arm is constituted by inserting the manipulating arm into a hole in the manipulating arm, with the result that water enters the inside of the transmissions through a small gap between the hole and the operating rod.

It is therefore a first object of the present invention to provide a compact and light-weight transmission designed for self-propelled walking lawn mowers.

It is a second object of the present invention to provide a transmission for a self-propelled lawn mower which can apply pressing force uniformly on the friction surfaces of a slider and a driven gear.

It is a third object of the present invention to provide a transmission for a self-propelled walking lawn mower which can prevent water entrance into the transmission.

SUMMARY OF THE INVENTION

In order to attain the above objects, the prevent invention provides a transmission for use in a self-propelled walking lawn mower, the transmission comprising:

i) a casing;

ii) input and output shafts supported by the casing, the output shaft rotationally driving ground engaging wheels of the mower and the input shaft receiving drive force from an engine of the mower wherein the input shaft extends substantially perpendicular to the output shaft and is located almost directly above the output shaft;

iii) a drive gear secured on the input shaft;

iv) a driven gear rotatably mounted on the output shaft and meshing with the drive gear; and v) a clutch for transmitting the rotation of the driven gear to the output shaft.

Further the present invention provides a transmission for use in a self-propelled walking lawn mower, the transmission comprising:

i) a casing;

ii) input and output shafts supported by the casing, the output shaft driving ground engaging wheels of a mower and the input shaft receiving drive force from a mower engine and extending substantially perpendicular to the output shaft;

iii) a drive gear secured on the input shaft;

iv) a driven gear rotatably mounted on the output shaft;

v) a slider mounted on the output shaft for rotation therewith and slidable in an axial direction; and vi) an actuator operable externally of the casing, the actuator engaging and sliding the slider toward the driven gear, wherein, to provide a friction clutch, the driven gear and the slider have annular friction surfaces which can frictionally contact with each other, the axial cross section of one of the friction surfaces being V-shaped and the axial cross section of the other friction surface being wedge-shaped so that both side faces of the V-shaped surface can contact both side faces of the wedge-shaped surface.

Still further, the present invention provides a transmission for use in a self-propelled walking lawn mower, the transmission comprising:

i) a casing;

ii) input and output shafts supported by the casing, the output shaft driving ground engaging wheels of a mower and the input shaft receiving drive force from a mower engine and extending substantially perpendicular to the output shaft;

iii) a drive gear secured on the input shaft;

iv) a driven gear rotatably mounted on the output shaft and having an annular friction surface to form a friction clutch;

v) a slider mounted on the output shaft for rotation therewith and slidable in an axial direction so as to come in or out of contact with the friction surface of the driven gear;

vi) a spring mounted on the output shaft between the driven gear and the slider and urging the driven gear and the slider away from each other; and vii) an actuator operable externally of the casing, the actuator engaging and sliding the slider toward the driven gear against the spring force of the spring, wherein the actuator comprises (i) a pressure member located between the slider and the casing, the pressure member being rotatable about the output shaft and slidable in an axial direction and (ii) first and second operating portions provided on oppositely facing faces of the pressure member and the casing respectively, the first operating portion having a plurality of circumferentially extending inclined planes and the second operating portion having a plurality of contacting portions to engage the inclined planes of the first operating portion so that the inclined planes serve to slide the pressure member toward the slider when the pressure member is rotated with the first and second operating portions being in contact with each other, and wherein the actuator further comprises a manipulating arm for externally rotating the pressure member.

Still further, the present invention provides a transmission for use in a self-propelled walking lawn mower, the transmission comprising:

i) a casing;

ii) input and output shafts supported by the casing, the output shaft driving ground engaging wheels of a mower and the input shaft receiving driving force from a mower engine and extending substantially perpendicular to the output shaft;

iii) a drive gear secured on the input shaft;

iv) a driven gear rotatably mounted on the output shaft and having an annular friction surface to form a friction clutch;

v) a slider mounted on the output shaft for rotation therewith and slidable in an axial direction so as to come in or out of contact with the friction surface of the driven gear;

vi) a spring mounted on the output shaft between the driven gear and the slider and urging the driven gear and the slider away from each other; and vii) an actuator operable externally of the casing, the actuator engaging and sliding the slider toward the driven gear against the spring force of the spring, wherein the actuator comprises: (i) an operating rod supported by the casing to project from the inside of the casing extending substantially perpendicular to the output shaft from the output shaft and to project from the inside of the casing; (ii) a fork-shaped portion having two extensions extending from near the operating rod so that the output shaft exists between the extensions; (iii) a manipulating arm connected to the outer end of the operating rod and extending substantially perpendicular to the operating rod; and (iv) slip-off preventing means for ensuring the connection of the manipulating arm to the operating rod, and wherein the manipulating arm covers the outer surface and the end surface of the outer end of the operating rod, a seal member being applied over a gap between the manipulating arm and the casing.

The features and advantages of the present invention will be more apparent from the following detailed description of preferred embodiments with reference to the accompanying drawings.

DETAILED DESCRIPTION OF THE PREFERRED EMBODIMENTS

Figure 1:
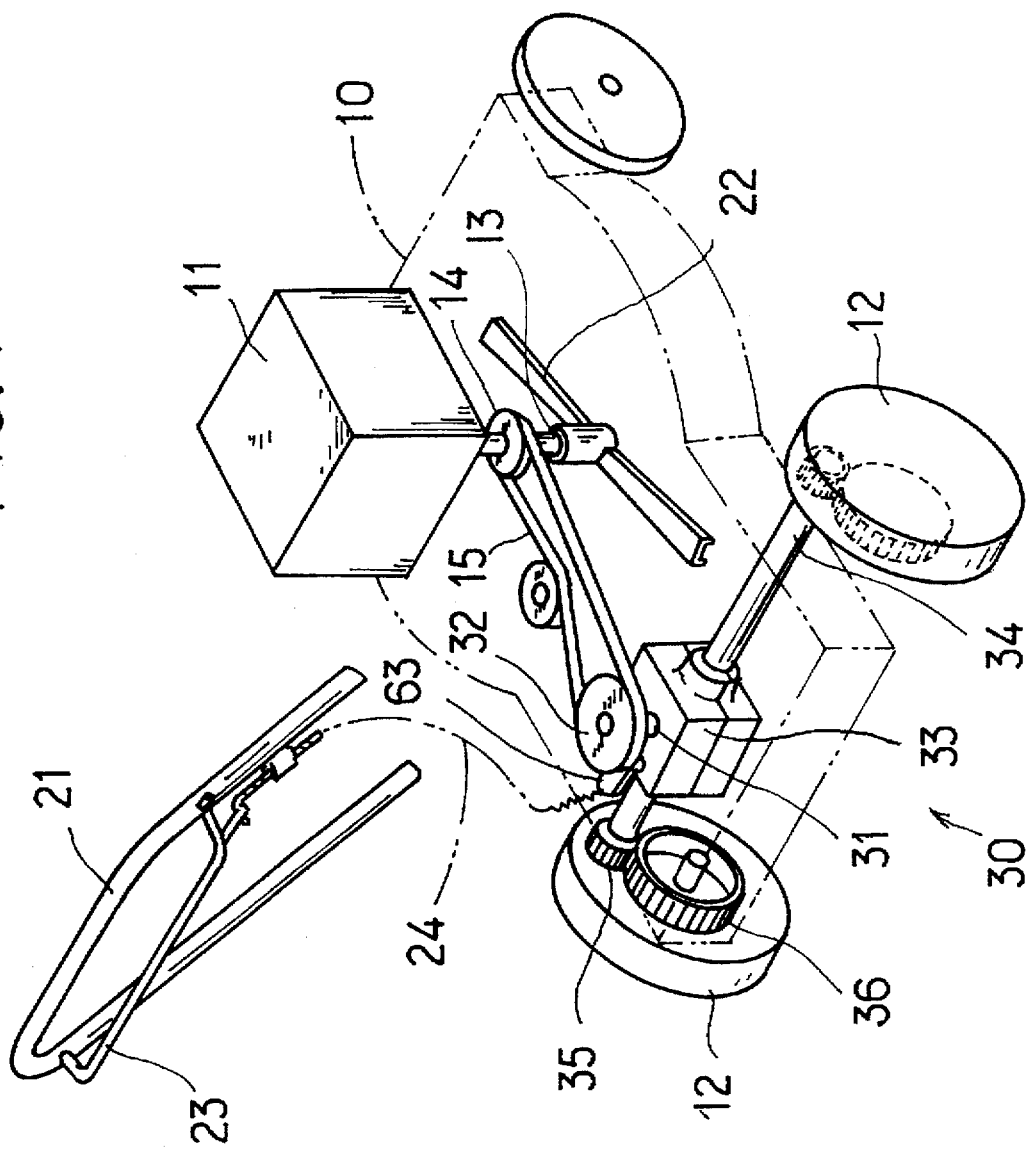
FIG. 1 is a perspective view of a self-propelled walking lawn mower comprising the transmission according to the present invention.
Figure 2:
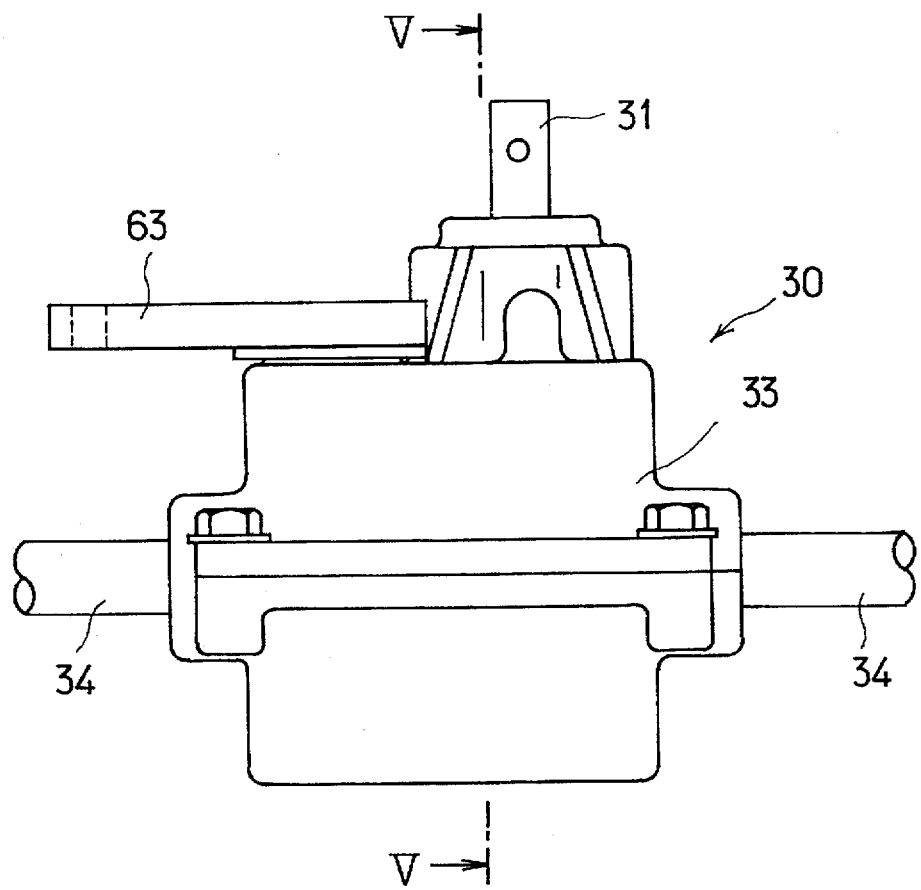
FIG. 2 is a front elevation of the first embodiment of a transmission for self-propelled walking lawn mowers according to the present invention.
Figure 3:
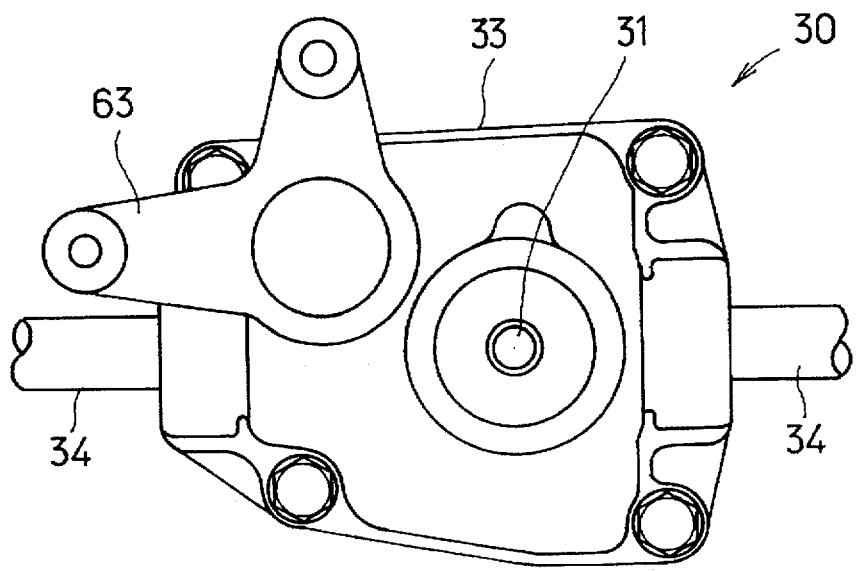
FIG. 3 is a plan view of the transmission of FIG. 2.

FIG. 1 illustrates an exemplary self-propelled walking lawn mower with the transmission according to the present invention. This lawn mower is of a self-propelled and rear wheel 12 driven type having an engine 11 mounted on a mower frame 10. An operator can manipulate the mower, while walking, with his hands grasping a handlebar 21 which extends rearwardly from the mower frame 10. On a shaft 13 extending from the engine 11 is mounted a grass cutting blade 22. On the shaft 13 is also mounted a pulley 14 which, through a belt 15, drives a pulley 32 mounted on an input shaft 31 of a transmission 30 for driving rear ground engaging wheels. From the inside of a casing 33 of the transmission 30 extends an output shaft 34 in a width direction of the mower frame 10. Gears 35 mounted on the opposite ends of the output shaft 34 mesh with gears 36 provided on the rear ground engaging wheels so as to drive the rear ground engaging wheels. The transmission 30 is provided with a clutch described later. The clutch is manipulated by a manipulating arm 63 which projects from the transmission 30. On the upper portion of the handlebar 21 is provided a lever 23 pivotable about its horizontal axis. A cable 24 extends from the lever 23 up to the manipulating arm 63. The operator grasps the lever 23 together with the handlebar 21 so that the lever 23 may pivot and pull the cable 24. Then, the manipulating arm 63 pivots and engages the clutch whereby drive power from the engine 11 is transmitted to the rear ground engaging wheels and then the lawn mower advances.

Figure 4:
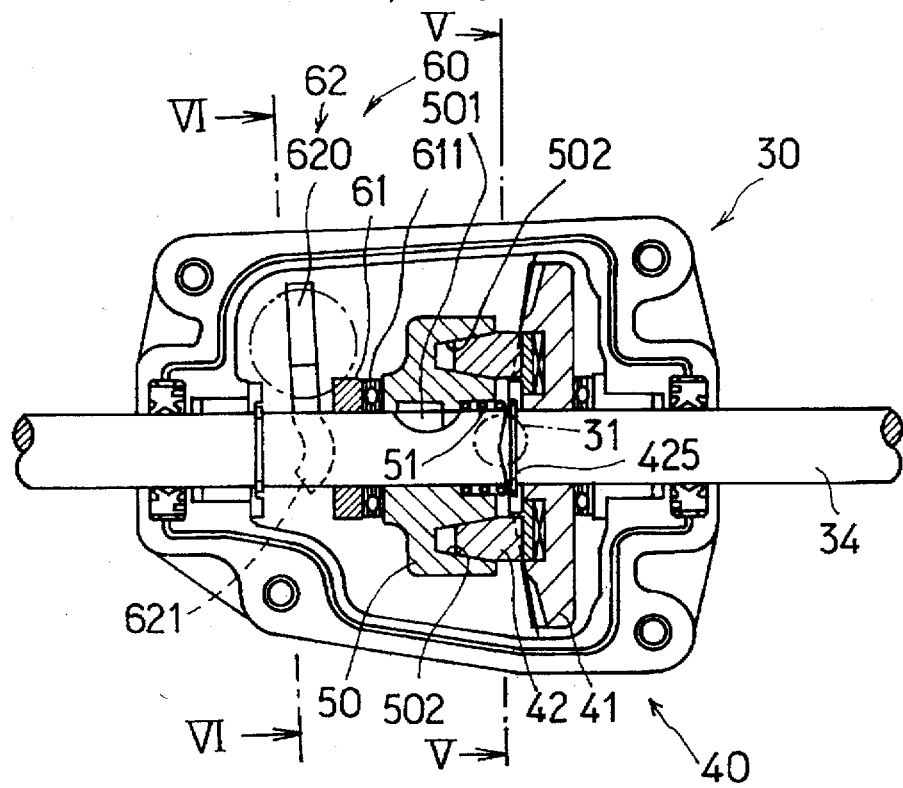
FIG. 4 is a horizontal cross section of the transmission of FIG. 2.
Figure 5:
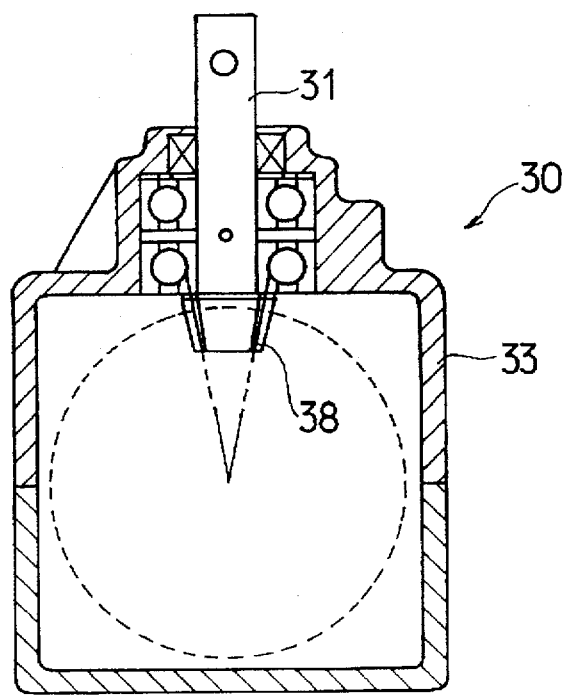
FIG. 5 is a cross section taken along the line V—V in FIG. 2 and in FIG. 4, illustrating the position of an input shaft in a casing with other parts being omitted.
Figure 6:
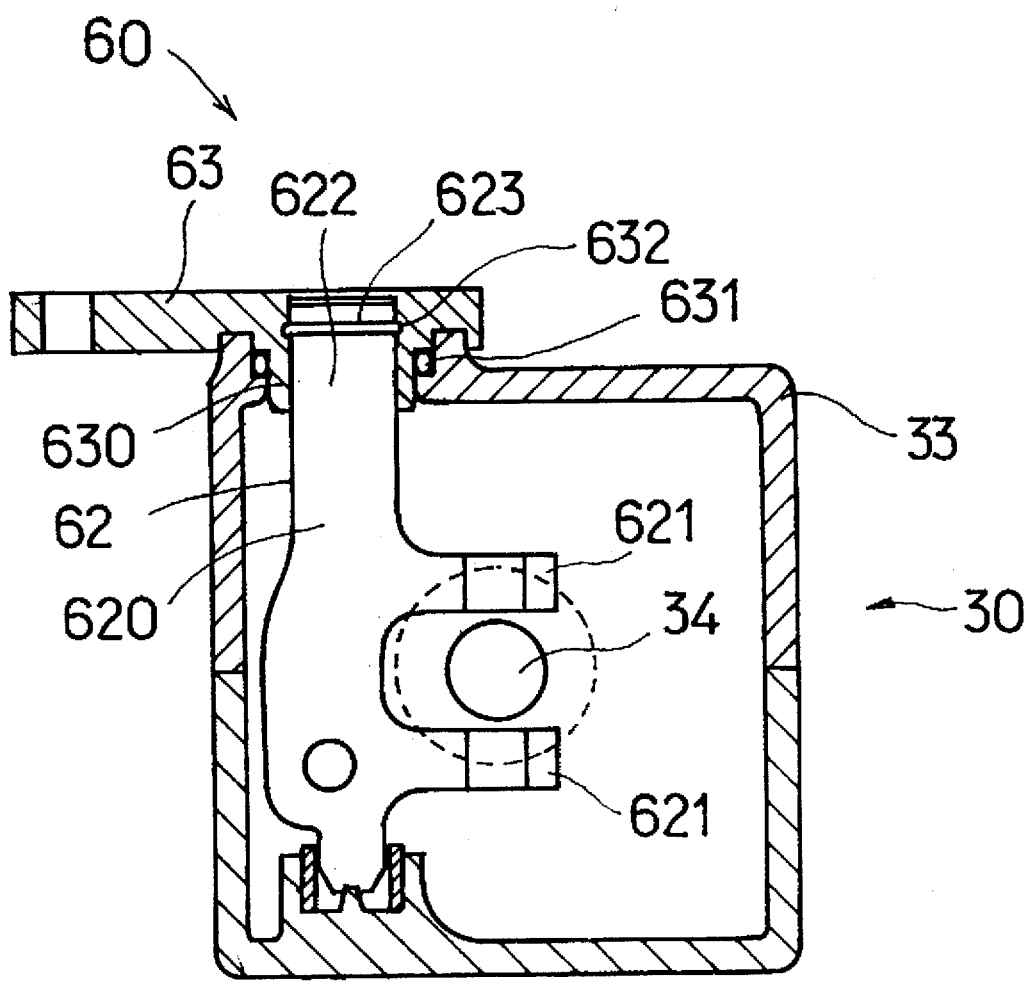
FIG. 6 is a cross section taken along the line VI—VI in FIG. 4, illustrating the positions of an operating rod and an manipulating arm in the casing with other parts being omitted.
Figure 7:
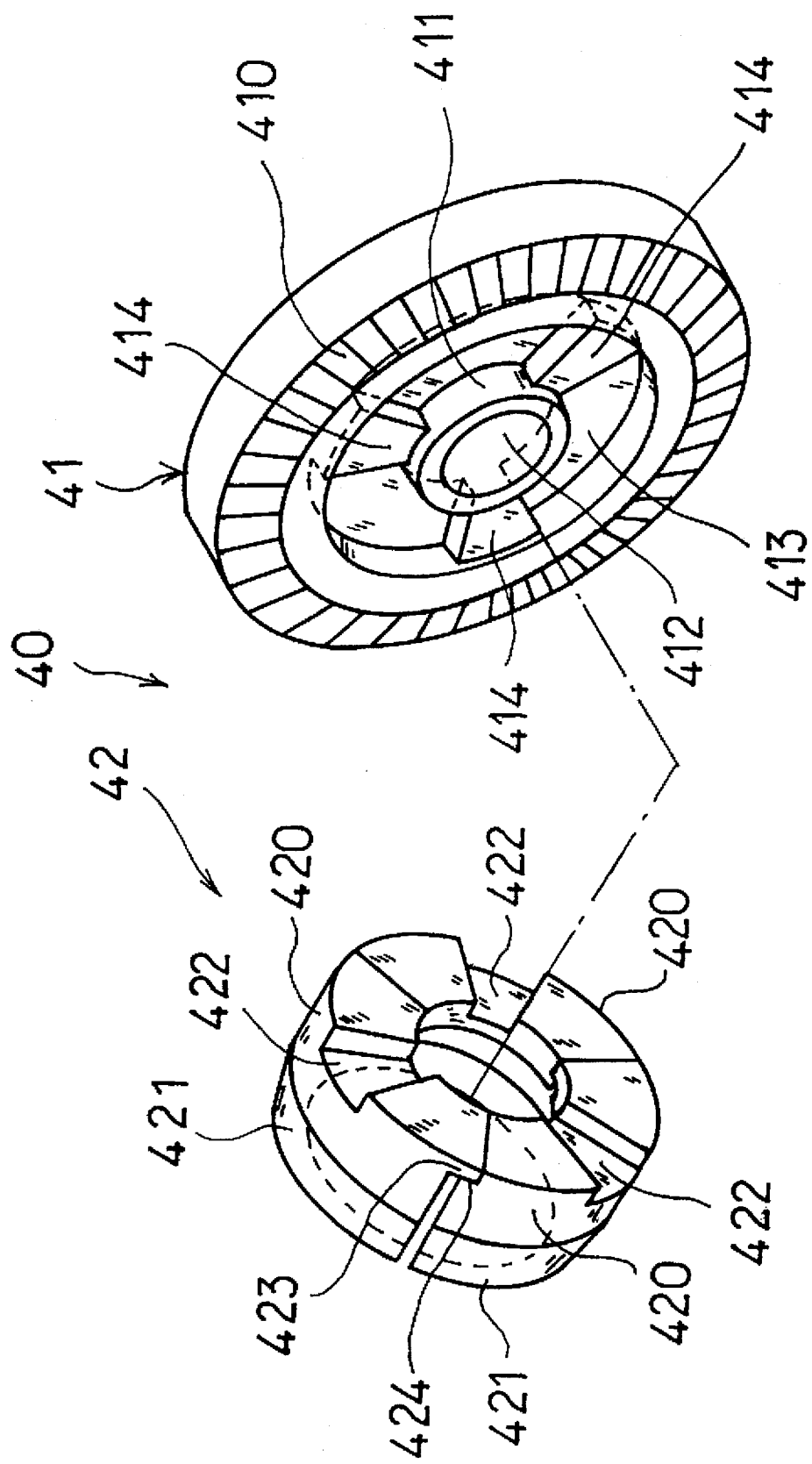
FIG. 7 is an exploded perspective view of a driven gear and a friction member employed by the transmission of FIG. 2.

FIGS. 2 to 6 illustrate the transmission 30 in detail. From the inside of the casing 33, an input shaft 31 vertically projects and an output shaft 34 horizontally projects. A bevel gear of a small diameter, i.e., a drive gear 38 is secured on the lower end of the input shaft 31 within the casing 33 (FIG. 5). On the output shaft 34 is rotatably mounted a bevel gear of a large diameter, i.e., a driven gear 40 (FIG. 4) in mesh with the drive gear 38. On the output shaft 34 is further mounted a slider 50 which rotates with the output shaft and is slidable in a axial direction. The driven gear 40 includes, as shown in FIG. 7, a disc 41 having teeth 410 circumferentially formed on its periphery and an annular friction member 42 disposed in the slider-side face. The disc 41 includes a boss 411 at its central portion, the boss 411 having a hole 412 into which the output shaft 34 is fitted. Between the boss 411 and the teeth 410 is formed an annular groove 413 in which three raised and radially extending portions 414 are formed.

Figure 8:
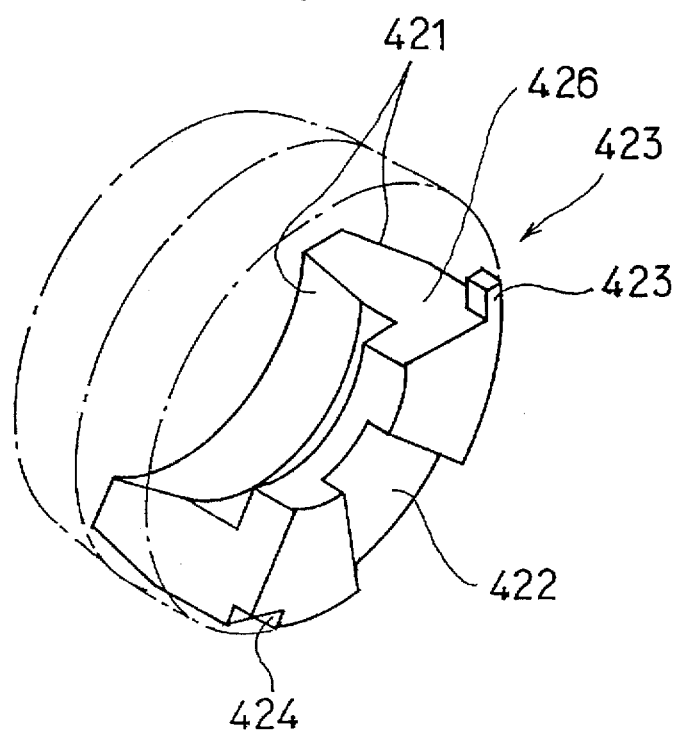
FIG. 8 is a perspective view illustrating one of friction pieces constituting the friction member in FIG. 7.

The friction member 42 is composed of three segmented friction pieces which are circumferentially aligned so as to form a ring. Each of the friction pieces 420 has a wedge-shaped radial cross section tapered to the slider 50, both side faces of the friction piece forming a friction surface 421. On the opposite end of the friction piece 420 is formed a recess 422 which engages one of the raised portions 412 of the disc 411. The friction piece 420 is accommodated in the groove 413 with a slight clearance in a radial direction and is prevented from circumferentially moving with respect to the disc 41 by the engagement of the recess 422 with the raised portion 414. Each of the friction pieces 420 is attached to the disc 41 by means of a snap-ring 425 and has a lug 423 formed at the outer and disc-side corner of a wall 426 as shown in FIG. 8, the lug projecting opposite to a rotational direction of the friction member 42. The lug 423 of one of the friction pieces 420 engages a corresponding recessed portion 424 of another friction piece 420 situated backward in a rotational direction, whereby each friction piece 420 is prevented from floating off from the groove 413 because the recessed portion 424 of a rear friction piece 420 presses down the lug 423 of a fore friction piece 420.

The slider 50 is keyed to the output shaft 34 by a key 501 so that it cannot rotate relative to the output shaft 34. The slider 50 has a friction surface 502 on the driven gear side, the friction surface 502 having a substantially V-shaped radial cross section and being capable of engaging the friction surface 421 of the driven gear 40.

As described, the driven gear 40 and the slider 50 constitute a clutch for engaging or disengaging the transmission by use of the engagement and disengagement between the friction surfaces 421 and 502. In this clutch, power transmission is conducted by engaging the wedged-shaped friction surface 421 of the friction piece 420 with the V-shaped friction surface 502 of the slider 50, whereby a great deal of drive power can be transmitted due to a large friction surface engagement. Accordingly, it is possible to reduce the diameters of the friction piece 420 and the slider 50, thereby realizing a reduced weight and size of a transmission.

A spring 51 is disposed between the driven gear 40 and the slider 50 to urge them away from each other.

At the opposite side of the slider 50 is disposed an externally manipulatable actuator 60 for engaging or disengaging the transmission. The actuator 60 comprises an intermediate member 61 in contact with one side of the slider 50, an operating rod 62 in contact with one intermediate member side facing diametrically opposite to the slider 50 and a manipulating arm 63 engaged with the operating rod 62. The intermediate member 61 is rotatably mounted on the output shaft 34 and contacts with the slider 50 via a ball bearing 611. The operating rod 62 comprises a shaft 620 which is supported by the casing and extends substantially vertical from near the output shaft 34 to the outside of the casing. The operating rod also comprises a fork portion 621 having two extensions extending from the shaft 620 so that the output shaft 34 exists between the extensions. The manipulating arm 63 is connected to the projecting end of the operating rod 62 and extends substantially perpendicular to the operating rod 62. When the manipulating arm 63 is pivoted, then the operating rod 62 is pivoted so as to swing the fork portion 621 and thereby slide the slider 50 toward the driven gear 40 against the spring force of the spring 51 whereby the friction surfaces 421 and 502 contact with each other and the clutch is engaged. On the other hand, when the pivoting force applied on the manipulating arm 63 is released, the slider 50 is disengaged from the driven gear 40 by the spring force of the spring 51, whereby the clutch is disengaged.

In this embodiment, at the connecting portion between the manipulating arm 63 and the operating rod 62 is formed a boss 630 one end of which projects inside a hole of the casing 33 and the other end is closed to cover the projected end 622 of the operating rod 620. Between the boss 630 and the wall of the casing 33 is fitted a seal ring 631. A protrusion 623 circumferentially formed on the operating rod 62 engages a recess 632 formed on the interior surface of the manipulating arm 63 so as to prevent the slipping-off of the manipulating arm 63. This construction ensures that water does not enter the inside of the casing from the connecting portion between the operating rod 62 and the manipulating arm 63.

In this embodiment of the transmission, the input end of the input shaft 31 is located almost directly above the output shaft 34 and disposed at the slider-side of the driven gear 40 (in FIG. 4, the input shaft 31 is shown by a dashed line). More specifically, the input end of the input shaft 31 is located relatively at the mid portion of the casing 33. Therefore, to install in a mower, the transmission 30 can be turned 180° with respect to the output shaft 34, whereby it is possible to reverse the rotational direction of the output shaft 34 with respect to that of the input shaft 31.

Figure 9:
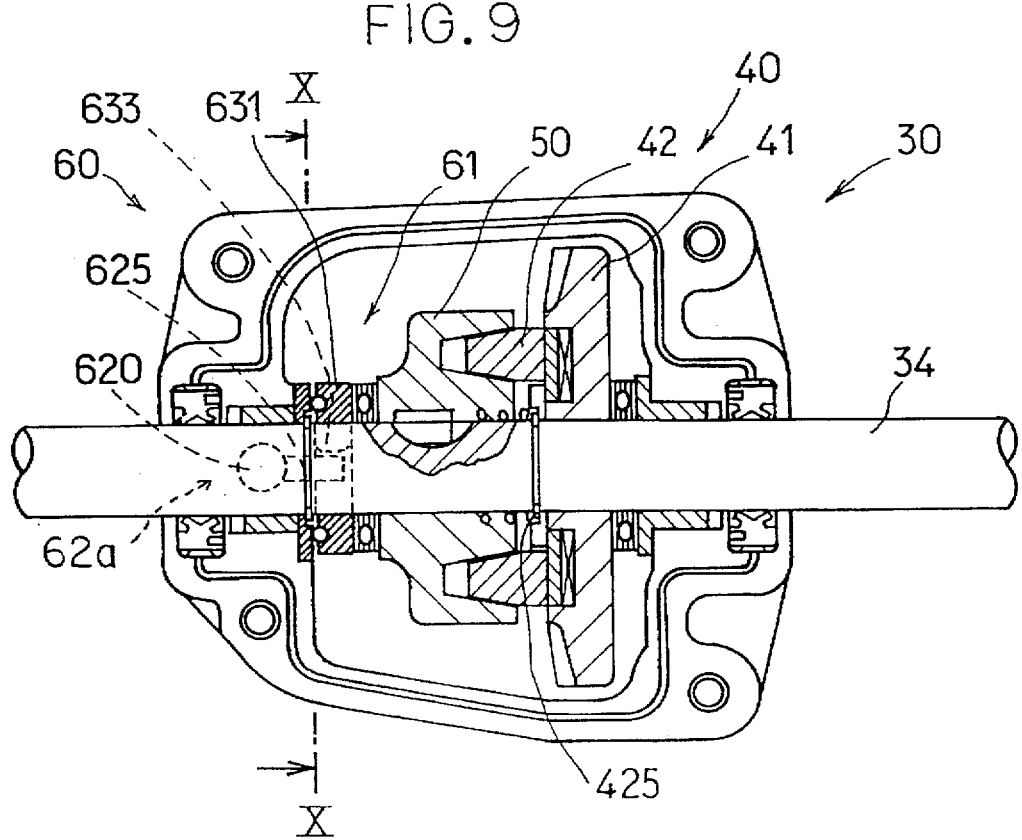
FIG. 9 is a horizontal cross section of another embodiment according to the present invention.

FIG. 9 shows another embodiment of the transmission according to the present invention. Like parts as in the previous embodiment are designated by the same reference numerals, and the descriptions therefor are omitted. In this embodiment, an actuator 60a for sliding the slider 50 comprises a pressure member 61 disposed between the slider 50 and the casing 33 and an actuator 64 provided between oppositely facing faces of the pressure member 61 and the casing 33.

Figure 10:
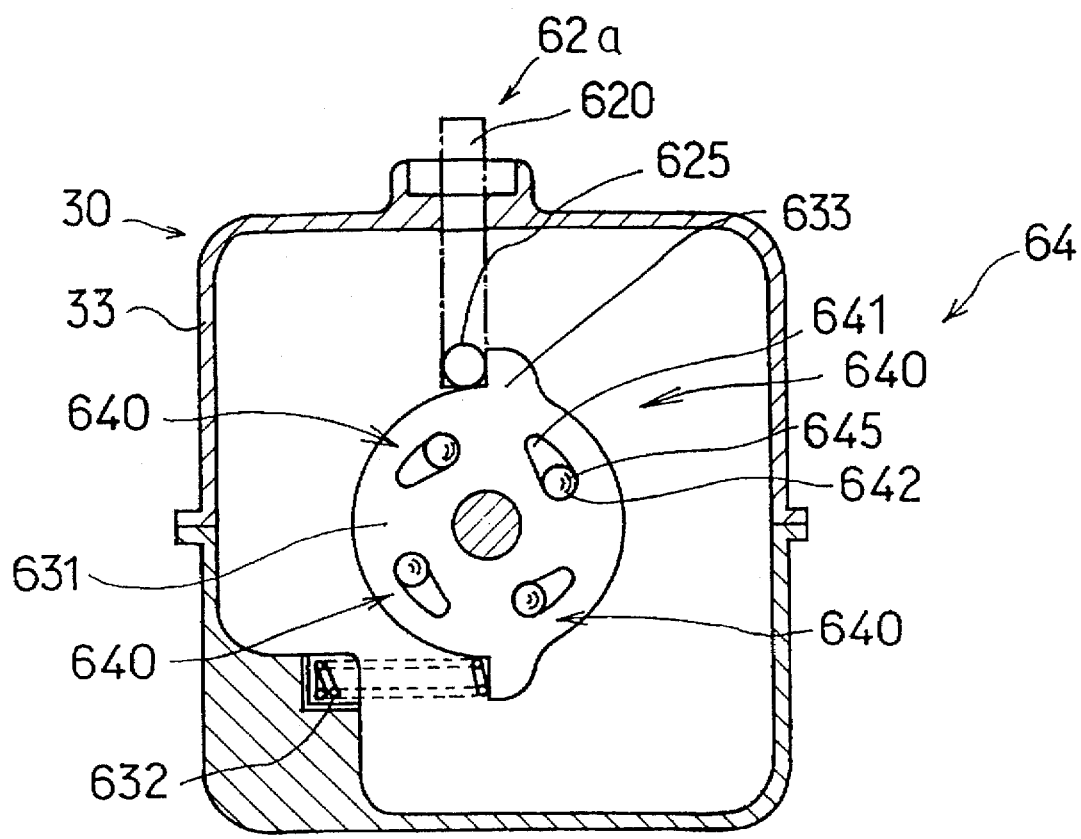
FIG. 10 is a cross section taken along line X—X in FIG. 9, illustrating an actuator and a manipulating arm in the casing with other parts being omitted.

The pressure member 61 comprises a disc 631 rotatably mounted on the output shaft 34 and axially slidable on the output shaft 34, a spring 632 for urging a lower projection of the disc 631 in a counterclockwise direction as shown in FIG. 10 and a upper projection 633 upwardly extending from the upper end of the disc 631. In this embodiment, an operating rod 62a comprises a shaft 620 located above the output shaft 34 and extending outwardly from the inside of the casing 33 and an engaging rod 625 extending substantially parallel to the output shaft 34 from the lower end of the shaft 620. The engaging rod 625 is in engagement with the projection 633 of the pressure member 61, and when the operating rod is pivoted, the engaging rod 625 rotates the pressure member 61 in a clockwise direction against the spring force of the spring 632 as shown in FIG. 10.

Figure 11A:
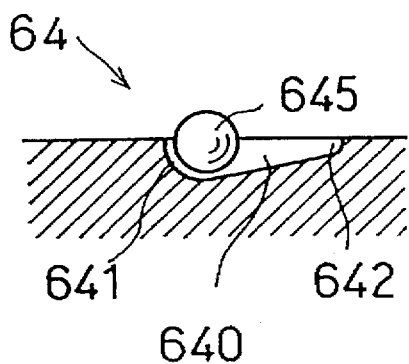
FIGS. 11a and 11b illustrate the actions of a teardrop-shaped recess and a ball both provided in the actuator according to the embodiment shown in FIG. 9.
Figure 11B:
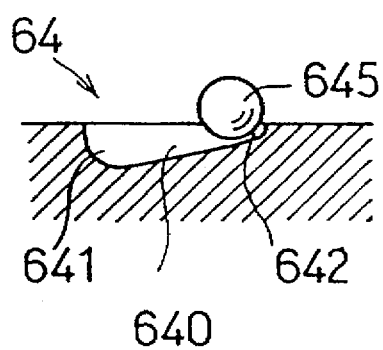

The actuator 64 comprises a first operating portion (FIG. 10), i.e., recesses 640 formed on the disc 631 and a second operating portion, i.e., balls 645. The respective recesses 640 are teardrop-shaped and have a shallow and small-diameter portion 642 which changes smoothly into a deep and large-diameter portion 641 as seen from its cross-sectional view denoted as FIGS. 11a and 11b. The respective recesses 640 are provided in such a manner that each small-diameter portion 642 is placed ahead of each corresponding large-diameter portion 641 in a counterclockwise direction as shown in FIG. 10.

Alternatively, it is possible to form the recesses 640 on a casing wall facing the disc 631. Instead of using recesses and balls, it is possible to form a plurality of inclined plates as the first operating portion and a plurality of contacting portions as the second operating portion which contact the inclined plates of the first actuator so that when the pressure member is rotated with the first and second operating portions in contact with each other, the pressure member 61 may be moved toward the slider 50.

Figure 12:
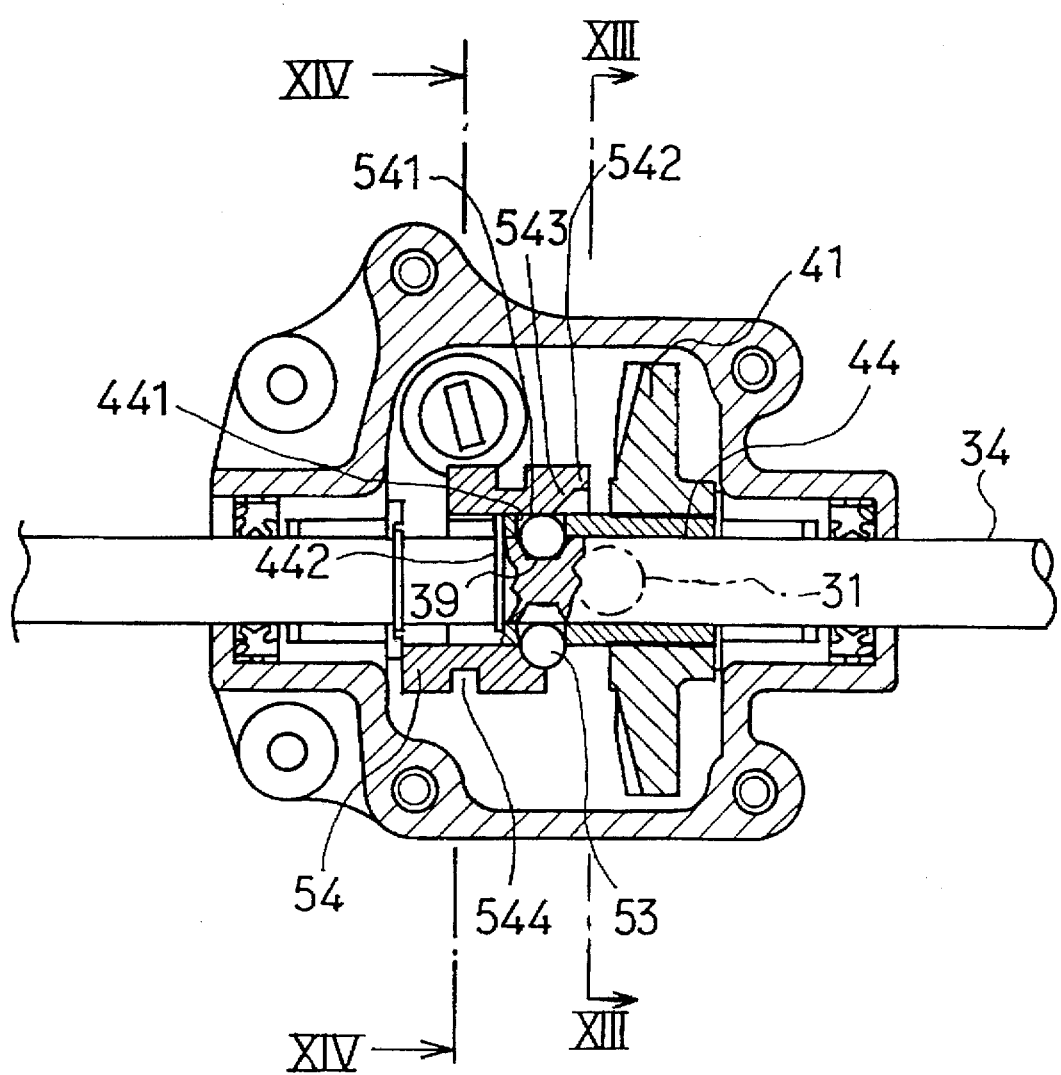
FIG. 12 is a horizontal cross section of still another embodiment of the present invention.
Figure 13:
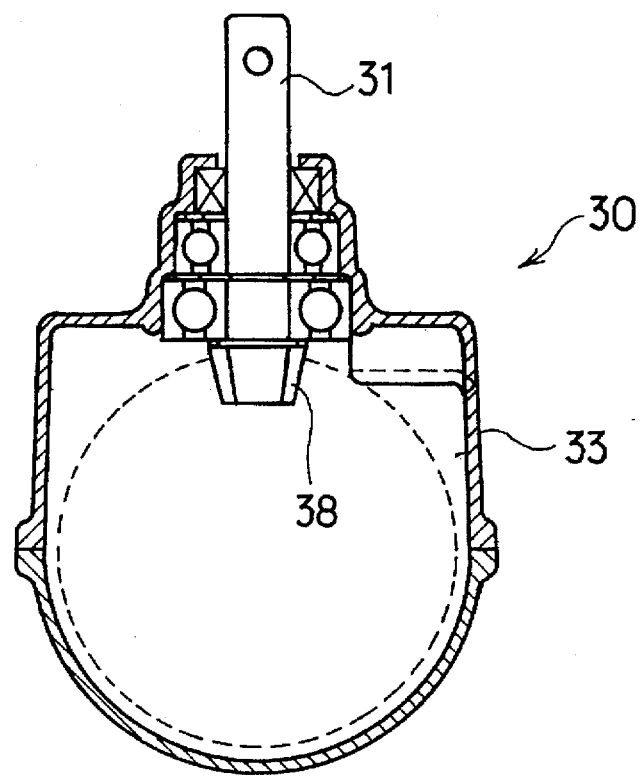
FIG. 13 is a cross section taken along the line XIII—XIII of FIG. 12.
Figure 14:
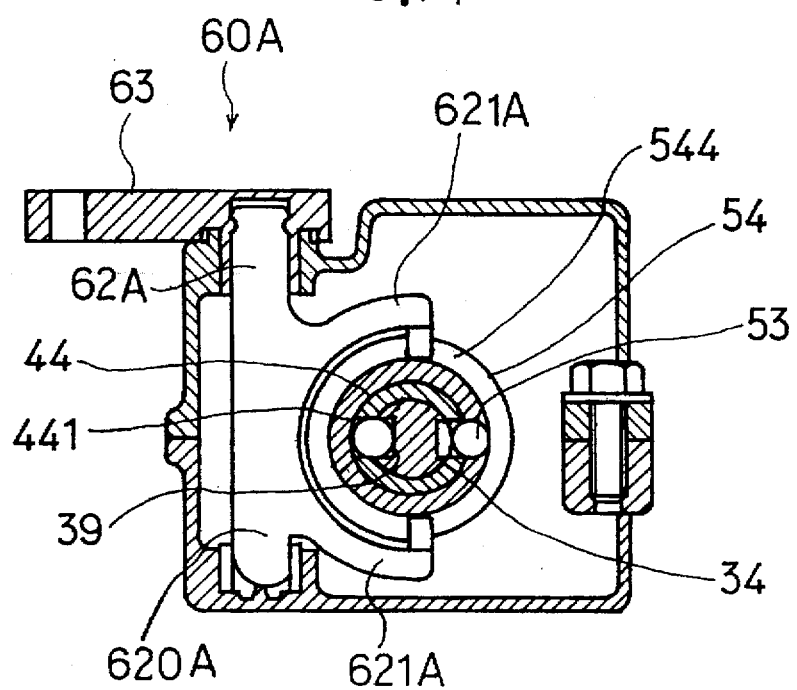
FIG. 14 is a cross section taken along the line XIV—XIV of FIG. 12 illustrating the position of the input shaft in the casing, other parts being removed.

FIGS. 12 to 14 show still another embodiment of the present invention. In this embodiment, the driven gear 40 comprises a disc 41 having teeth 410 formed on its one side surface and a metal tube 44 being secured in the center hole of the disc 41 and extending from the disc toward one end of the output shaft 34. The tube 44 is rotatably fitted on the shaft 34, and on the extended portion of the tube 44 are formed a plurality of holes 441 (two holes in this embodiment). The driven gear 40 is secured not to move in an axial direction by a snap ring 442 which abuts the tube 44. On the shaft 34 are provided recesses 39 which are so formed as to align with the holes 441. Balls 53 are received in the holes and the recesses 39 in such a manner that they can move in and out of the recesses. On the tube 44 is fitted an axially slidable ring 54. The inner surface of the ring 54 is constituted by a small diameter portion 541, a large diameter portion 542 and an inclined portion 543 between the portions 541 and 542, the diameter of the portion 542 is larger than the portion 541 so that it can receive and allow the ball 53 to move out of the recess 39. On the outer surface of the ring 54 is provided a circumferential groove 544. The upper half of FIG. 12 illustrates that the ring 54 has been moved to the right side and thus the ball 53 is received in the recess 39, while the lower half of FIG. 12 illustrates that the ring 54 has been moved to the left side and thus the ball 53 is out of the recess 39.

Close to the ring 54 in the casing 33 is disposed an actuator 60A for sliding the ring 54 with an operation from outside of the casing 33. The actuator 60A comprises an operating rod 62A and a manipulating arm 63 connected thereto. The operating rod 62A comprises a shaft 620A and fork portions 621A so extending as to pinch the output shaft 34, one end of the operating rod 62A being supported by the casing 33 and the other end projecting from the casing 33, the shaft 620A extending substantially perpendicular to the output shaft 34 in the vicinity of this shaft, and the ends of the fork portions 621A engaging the grooves 544 of the ring 54. The manipulating arm 63 is the same as shown in FIG. 6 and connected to the projecting end of the operating rod 62A.

The above mechanism operates as follows. In the case of not transmitting the rotation of the input shaft 31 to the output shaft 34, the ring 54 is moved away from the driven gear 40 and the balls 53 are accommodated between the holes 441 of the tube 44 and the large diameter portion 542 of the ring 54 (see the lower half of FIG. 12 and the right half of FIG. 14). In the case of transmitting the rotation of the input shaft 31 to the output shaft 34, the manipulating arm 63 is pivoted from the disengagement position of the clutch. Then, the operating rod 62A is pivoted so that the fork portion 621A slides the ring 54 toward the driven gear 40. Thereby, the ball 53 is pressed by the ring 54 along the inclined portion 543 toward the recess 39, and then pressed by the small diameter portion 541 into the hole 441 of the tube 44 and the recess 39 on the output shaft 34 (see the upper half of FIG. 12 and the left half of FIG. 14). In this manner, the rotation of the driven gear 40 is transmitted to the output shaft 34 through the tube 44 and the ball 53. In order not to transmit the rotation of the input shaft 31 to the output shaft 34, the ring 54 is moved away from the driven gear 40. Thereby, the balls 53 return to the holes of the tube 44 and the large diameter portion 542 of the ring 54 by centrifugal force generated by the rotation of the output shaft 34. As described, the ring 54, the ball 53, the tube 44 and the hole 441 of the output shaft 441 constitute a clutch for rotation transmitting.

Figure 15:
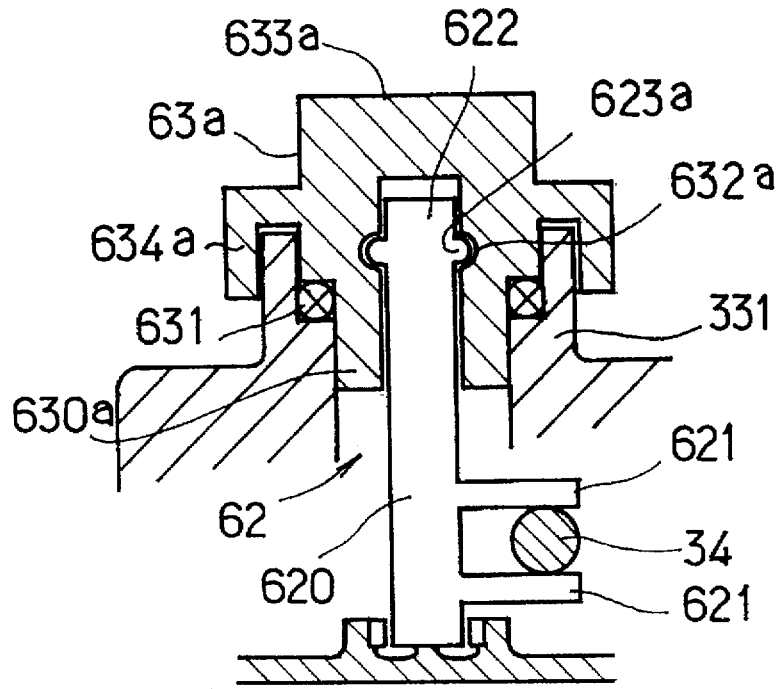
FIGS. 15 to 18 are vertical cross sections illustrating various embodiments of an operating rod and a manipulating arm used in the transmission of the present invention.
Figure 16:
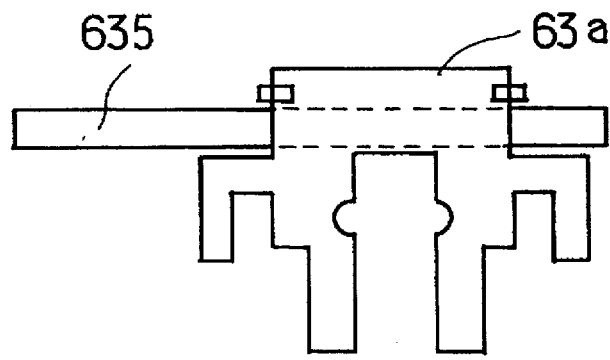
Figure 17:
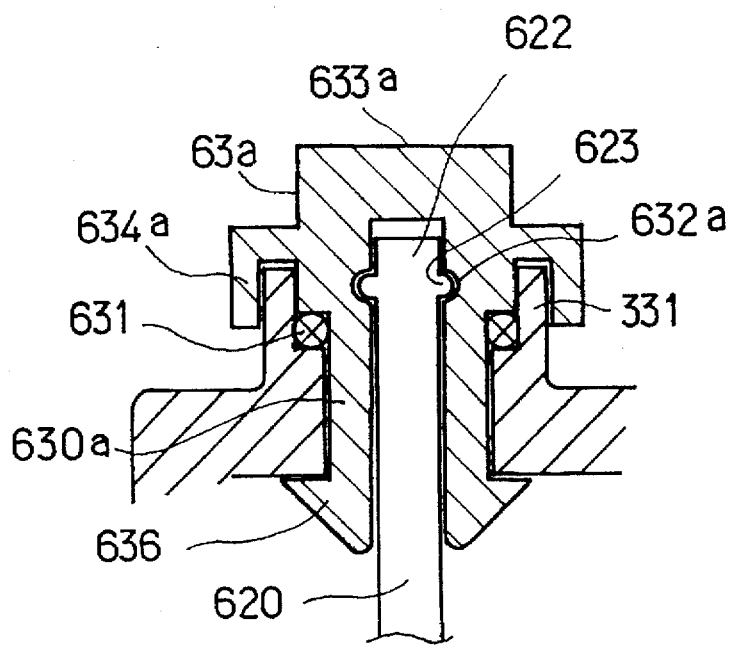
Figure 18:
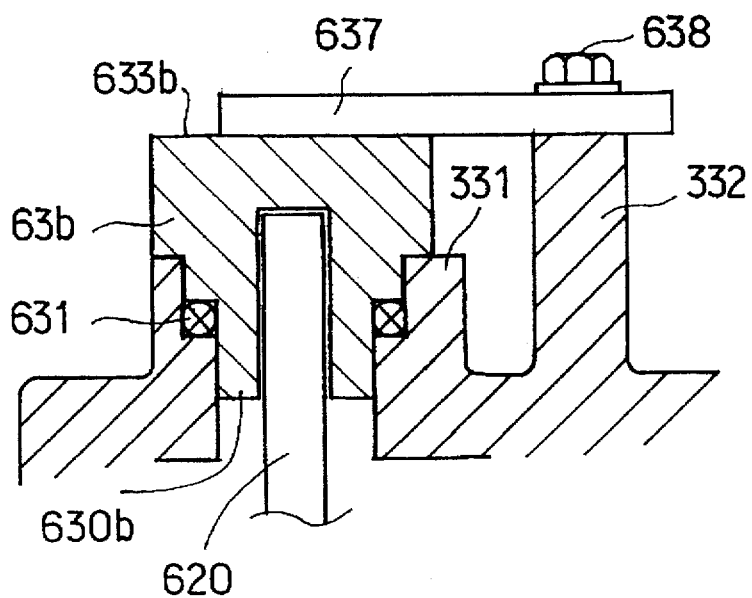

FIGS. 15 to 18 show various embodiments of seal members applied on the connecting portion between the operating rod and the manipulating arm. The seal member shown in FIG. 15 has an almost similar shape to that shown in FIG. 6. In FIGS. 15, 17 and 18, the longitudinal direction of the rod extends perpendicular to the drawing sheets. In the connecting portion of the manipulating arm 63a with the operating rod 62 is formed a boss 630a having its upper end closed with an upper wall 633a. Two projecting portions of the boss are received in a receiving hole of the casing 33. Between the boss 630a and the wall of the casing 33 is fitted a seal ring 631. One end 622 of the operating rod 62 is inserted into the boss of the manipulating arm 63 and covered by the manipulating arm 63a. The casing 33 comprises a grommet 331 extending upwardly so as to support the manipulating arm 63a, and the manipulating arm 63a has a cover portion 634a circumferentially formed on its outer surface, the cover portion extending downwardly so as to cover the grommet. The manipulating arm 63 is held so as not to be slipped off from the operating rod 62 by engagement between a ring-shaped projection 623a formed on the outer surface of the operating rod 63 and an annular groove 632a formed in the interior surface of the manipulating arm 63a. It is preferable that the manipulating arm 63a is molded of a plastic material integrally with the annular groove 632a.

FIG. 16 shows an embodiment of the manipulating arm 63a in which the connecting portion with the operating rod and the casing is made of a plastic material, and an elongate portion 635 of the manipulating arm is made of a metal.

FIG. 17 shows another embodiment of the manipulating arm 63a in which the legs of the boss 630a are extended to reach the interior surface of the casing, and the ends of the legs are provided with flanges 636. The other parts are identical with those of FIG. 15. According to this embodiment, since two parts prevent the manipulating arm 63a from being slipped off, the manipulating arm 63a can be held more reliably.

FIG. 18 shows still another embodiment in which a pressure bar 637 is fixed by a bolt 638 at the end of an upward projection 332 formed on the casing 33 in place of the projection 623 of the operating rod 62 and the groove 632 of the manipulating arm 63a. In this embodiment, a manipulating arm 63b has a simplified structure and therefore can be made of a metal.

A conventional connecting portion between a manipulating arm and an operating rod is such that an operating rod is inserted into a throughhole provided in a manipulating arm. Therefore, it was necessary to minimize the gap therebetween as much as possible in order to prevent the entry of water. Further, due to the need for processing high accuracy, a hole and a rod, each having a circular cross section, were commonly adopted, and a fork-shaped member was welded thereto. In the above-mentioned embodiments of the connecting portion, the end of the operating rod is covered by the manipulating arm and therefore water is prevented from entering the inside of the casing, whereby it is possible to choose the cross-section of the operating rod freely. As a result, the operating rod, including the fork-shaped member, may be made from one flat piece of a metal.

Figure 19:
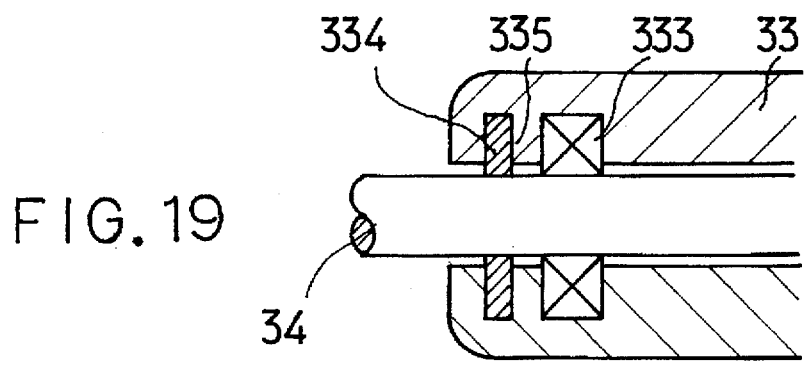
FIGS. 19 to 21 are vertical cross sections of various seal members used on an output shaft in the transmission of the present invention.
Figure 20:
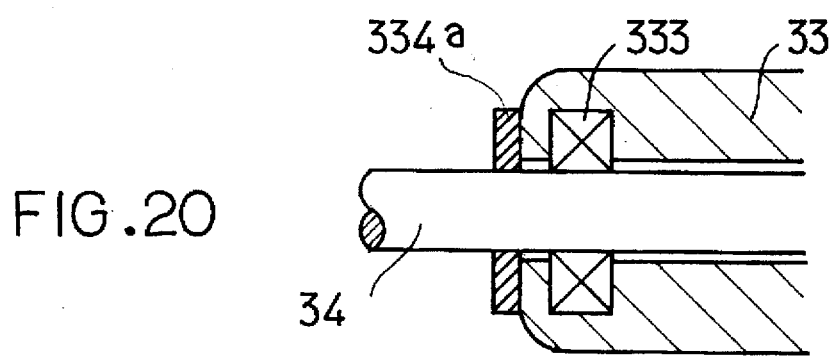
Figure 21:
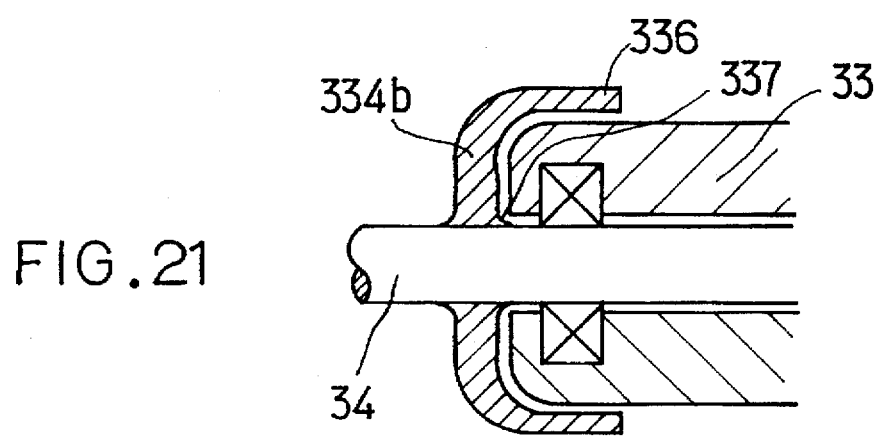

FIGS. 19–21 show various types of a seal member between the output shaft 34 and the seal member 33. In the embodiment of FIG. 19, a seal plate 334 is disposed exterior to an oil film seal 333 in an axial bore of the casing 33. In the embodiment of FIG. 20, a seal plate 334a is attached to the end of an axial bore of the casing 33. The attachment can be appropriately conducted by means of screws, adhesives or the like. In the embodiment of FIG. 21, a seal plate 334b has a flange fitted over the cylindrical portion in which a axial bore of the casing 33 is formed. At the center of the seal plate 334b is formed an annular projection 337 for engaging the axial bore of the casing 33 to thereby ensure the accurate positioning of the seal plate 334b with respect to the axial bore. The seal plates described above are made from various materials such as felt, rubber, sintered alloy (powder metal), metal, plastics or the like.

Using these seal plates in order to form a seal member, water or dust cannot enter the inside of the casing 33 through a gap between the output shaft 34 and the casing 33. Accordingly, these seal plates are very effective when the transmission is washed using high pressure water.

Figure 22:
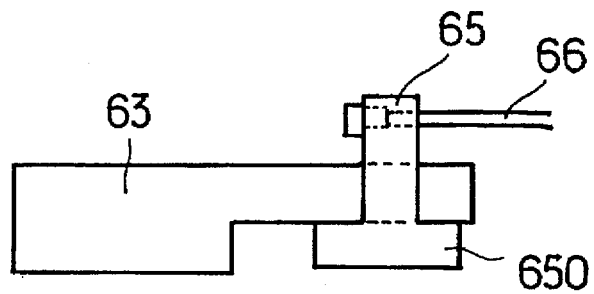
FIG. 22 is a front elevation of a connecting portion between the manipulating arm and a cable in the transmission of the present invention.
Figure 23:
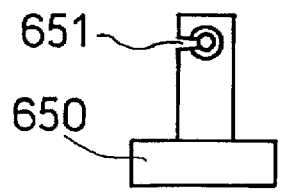
FIG. 23 is a side elevation illustrating a part of FIG. 19.
Figure 24:
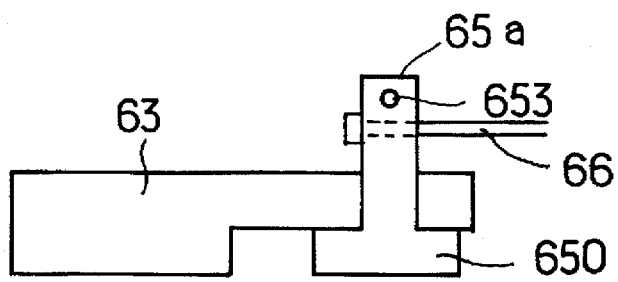
FIG. 24 is a front elevation of another embodiment of the connecting portion between the manipulating arm and the cable.
Figure 25:
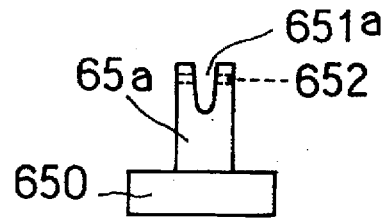
FIG. 25 is a side elevation illustrating a part of FIG. 20.
Figure 26:
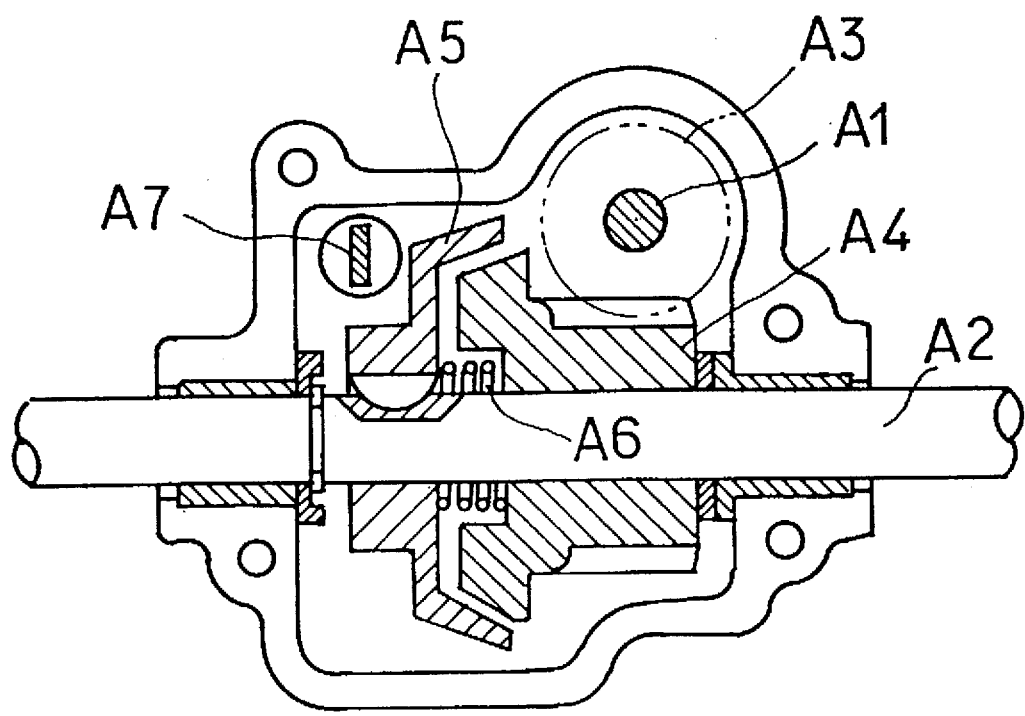
FIG. 26 is a vertical cross section illustrating an example of prior art transmissions.

FIGS. 22 to 25 show various types of the connecting portion between the manipulating arm 63 and the cable. In the embodiment of FIG. 22, at one end of the manipulating arm 63 is formed a hole into which a collar 65 is inserted. As shown in FIG. 23, the collar 65 has a lower end of a large diameter and has a groove 651 for receiving a cable at the upper end. The groove 651 has an opening slightly narrower than the diameter of the cable. The cable is inserted into the groove 651 by the elastic deformation of the collar 65. One end of the cable is made thick in order to prevent the cable from being slipped off once inserted into the groove. In the embodiment of FIG. 24, an upwardly opened groove 651a is formed at a collar 65a in place of the horizontally opened groove 651 as mentioned above. After a cable is inserted into this groove, a split pin 653 is passed therethrough to thereby prevent the cable from being slipped off. In this embodiment one end of the cable is also made thick and is thereby prevented from being disconnected from the groove. In this embodiment, the collar may be made of a metal such as steel, a plastic material, sintered alloy or the like.

In a conventional connecting portion between a manipulating arm and a cable, one end of the cable was bent and hooked on a hole formed in the manipulating arm. As a result, since the bent portion did not uniformly contact the hole, the hole became enlarged by repeated operations, thereby adversely affecting the mower operation which is controlled by pulling or releasing the cable. According to the above preferred connecting structures, since the collar uniformly contacts the interior surface of the hole of the manufacturing arm, the hole is prevented from being enlarged even after repeated operations, whereby a reliable operation of a transmission can be ensured.

Although this invention has been described in detail with respect to its preferred embodiments, it should be understood that various modifications will be apparent to those skilled in the art, and it is preferred, therefore, that the scope of the invention be limited not by the specific disclosure herein, but only by the appended claims.

We claim:

1. A transmission for use in a self-propelled walking lawn mower, the transmission comprising:

i) a casing;

ii) input and output shafts supported by the casing, the output shaft driving ground engaging wheels of the mower and the input shaft receiving drive force from an engine of the mower wherein the input shaft extends substantially perpendicular to the output shaft and is located substantially directly above the output shaft;

iii) a drive gear secured on the input shaft;

iv) a driven gear rotatably mounted on the output shaft and meshing with the drive gear; and v) a clutch mounted on the output shaft for transmitting the rotation of the driven gear to the output shaft.

2. A transmission according to claim 1, wherein the input shaft is disposed approximately above the center of the casing measured along the output shaft.

3. A transmission according to claim 1, wherein the clutch is and disposed on one side of the driven gear, an actuator is provided on the same side of the driven gear to operate the clutch from outside of the casing, and the input shaft is disposed between the driven gear and the actuator for the clutch.

4. A transmission for use in a self-propelled walking lawn mower, the transmission comprising:

i) a casing;

ii) input and output shafts supported by the casing, the output shaft driving ground engaging wheels of a mower and the input shaft receiving drive force from a mower engine and extending substantially perpendicular to the output shaft;

iii) a drive gear secured on the input shaft;

iv) a driven gear rotatably mounted on the output shaft;

v) a slider mounted on the output shaft for rotation therewith and slidable in an axial direction; and vi) an actuator operable externally of the casing, the actuator engaging and sliding the slider toward the driven gear, wherein, to provide a friction clutch, the driven gear and the slider have annular friction surfaces which can frictionally contact with each other, the axial cross section of one of the friction surfaces being V-shaped and the axial cross section of the other friction surface being wedge-shaped so that both side faces of the V-shaped surface can contact both side faces of the wedge-shaped surface.

5. A transmission according to claim 4, wherein the driven gear comprises an annular friction member having said one of the friction surfaces, the friction member being unrotatably secured to the driven gear.

6. A transmission according to claim 4, wherein the driven gear comprises a spring mounted on the output shaft between the driven gear and the slider and urging the driven gear and the slider away from each other.

7. A transmission according to claim 4, wherein the friction member comprises a plurality of segmented friction pieces which are circumferentially aligned to form a ring and held in a groove formed in the driven gear so that each of the friction pieces can move radially within a clearance for position-adjustment and does not circumferentially move relative to the driven gear.

8. A transmission according to claim 7, wherein the plurality of friction pieces constituting the friction member do not circumferentially move relative to the driven gear due to projections and recesses formed in the bottom surface of the groove and the groove-side surface of the friction pieces respectively, each of the friction pieces having a lug formed at the groove-side end of a side wall of the friction piece, and the lug projecting opposite to a rotational direction of the friction member and engaging a recessed portion formed at the groove-side end of the opposite diametrical side wall so that the friction pieces do not float off from the groove during rotation.

9. A transmission according to claim 4, wherein the friction member is not segmented.

10. A transmission for use in a self-propelled walking lawn mower, the transmission comprising:
   i) a casing;
   ii) input and output shafts supported by the casing, the output shaft driving ground engaging wheels of a mower and the input shaft receiving drive force from a mower engine and extending substantially perpendicular to the output shaft;
   iii) a drive gear secured on the input shaft;
   iv) a driven gear rotatably mounted on the output shaft and having an annular friction surface to form a friction clutch;
   v) a slider mounted on the output shaft for rotation therewith and slidable in an axial direction so as to come in or out of contact with the friction surface of the driven gear; and
   vi) an actuator operable externally of the casing, the actuator engaging and sliding the slider toward the driven gear against a spring force of a spring,
   wherein the actuator comprises
      (i) a pressure member located between the slider and the casing, the pressure member being rotatable about the output shaft and slidable in an axial direction and
      (ii) first and second operating portions provided on oppositely facing faces of the pressure member and the casing respectively, the first operating portion having a plurality of circumferentially extending inclined planes and the second operating portion having a plurality of contacting portions to engage the inclined planes of the first operating portion so that the inclined planes serve to slide the pressure member toward the slider when the pressure member is rotated with the first and second operating portions being in contact with each other, and
   wherein the actuator further comprises a manipulating arm for externally rotating the pressure member.

11. A transmission according to claim 10, wherein the inclined planes are recesses having a teardrop shape in which a shallow and small-diameter portion smoothly changes into a deep and large-diameter portion, and wherein the actuator comprises a plurality of balls positioned in the recesses and partially projected therefrom.

12. A transmission according to claim 10, wherein the driven gear comprises a spring mounted on the output shaft between the driven gear and the slider and urging the driven gear and the slider away from each other.

13. A transmission for use in a self-propelled walking lawn mower, the transmission comprising:
   i) a casing;
   ii) input and output shafts supported by the casing, the output shaft driving ground engaging wheels of a mower and the input shaft receiving driving force from a mower engine and extending substantially perpendicular to the output shaft;
   iii) a drive gear secured on the input shaft;
   iv) a driven gear rotatably mounted on the output shaft and having an annular friction surface to form a friction clutch;
   v) a slider mounted on the output shaft for rotation therewith and slidable in an axial direction so as to come in or out of contact with the friction surface of the driven gear; and
   vi) an actuator operable externally of the casing, the actuator engaging and sliding the slider toward the driven gear against a spring force of a spring,
   wherein the actuator comprises:
      (i) an operating rod supported by the casing to project from the inside of the casing extending substantially perpendicular to the output shaft from the output shaft and to project from the inside of the casing;
      (ii) a fork-shaped portion having two extensions extending from near the operating rod so that the output shaft exists between the extensions;
      (iii) a manipulating arm connected to the outer end of the operating rod and extending substantially perpendicular to the operating rod; and
      (iv) slip-off preventing means for ensuring the connection of the manipulating arm to the operating rod, and
   wherein the manipulating arm covers the outer surface and the end surface of the outer end of the operating rod, a seal member being applied over a gap between the manipulating arm and the casing.

14. A transmission for use in a self-propelled walking lawn mower, the transmission comprising:
   i) a casing;
   ii) input and output shafts supported by the casing, the output shaft driving ground engaging wheels of the mower and the input shaft receiving drive force from an engine of the mower wherein the input shaft extends substantially perpendicular to the output shaft and is located substantially directly above the output shaft;
   iii) a drive gear secured on the input shaft;
   iv) a driven gear rotatably mounted on the output shaft and meshing with the drive gear wherein the driven gear comprises a cylindrical member through which the output shaft extends, the cylindrical member having a plurality of holes and the output shaft having recesses on its surface each recess being located to align with each corresponding hole of the cylindrical member;

v) a plurality of balls received in the holes and the recesses such that they can move in and out of the recesses;

vi) a ring axially slidably fitted on the cylindrical member, wherein the ring comprises:

a small diameter portion having such a diameter as to contact and press the balls into both of the holes of the cylindrical member and the recesses of the output shaft;

a large diameter portion having a diameter larger than that of the small diameter portion so that it can receive the balls at least partially and allow the balls to move out of the recesses;

and an inclined portion smoothly linking the small diameter portion with the large diameter portion; and vii) an actuator operable externally of the casing, the actuator engaging and axially sliding the ring in the casing.

15. A transmission for transferring a motive force comprising:

an input shaft;

an output shaft; and a friction clutch including a drive member driven by rotation of said input shaft and having an annular friction surface, a driven member secured to said output shaft and having an annular friction surface, an axial cross section of one of said friction surfaces of said driven member and drive member being V-shaped and an axial cross section of the other one of said friction surfaces of said driven member and drive member being wedge-shaped so that both side faces of said V-shaped surface contact both side faces of said wedge-shaped surface, and an engaging means for selectively engaging said driven member and said drive member in an engaged position of said friction surfaces and for disengaging said driven member and said drive member in a disengaged position of said friction surfaces.

16. A transmission as claimed in claim 15, wherein the drive member comprises a holding member and an annular friction member having said one of said friction surfaces, said friction member being unrotatably secured to said holding member.

17. A transmission as claimed in claim 15, wherein the engaging means includes a spring mounted on said output shaft between said driven member and said drive member which urges said driven member away from said drive member.

18. A transmission as claimed in claim 16, wherein said friction member comprises a plurality of segmented friction pieces which are circumferentially aligned to form a ring and held in a groove formed in the holding member so that each of the friction pieces can move radially within a clearance for position-adjustment and does not circumferentially move relative to said holding member.

19. A transmission as claimed in claim 18, wherein the plurality of friction pieces constituting the friction member do not circumferentially move relative to the holding member due to projections and recesses formed in a bottom surface of the groove and a groove-side surface of the friction pieces respectively, each of the friction pieces having a lug formed at the groove-side end of a side wall of the friction piece, and the lug projecting opposite to a rotational direction of the friction member and engaging a recessed portion formed at the groove-side end of the opposite diametrical side wall so that the friction pieces don not float off from the groove during rotation.

* * * * *